United States Patent [19]
Laoteppitaks et al.

[11] 4,016,370
[45] Apr. 5, 1977

[54] DIGITAL TONE DECODER

[75] Inventors: Chansak Laoteppitaks, Orange; Lincoln Henthorn, Cheshire; Charles B. Falconer, Hamden, all of Conn.

[73] Assignee: Chestel, Inc., Chester, Conn.

[22] Filed: Mar. 19, 1975

[21] Appl. No.: 559,744

[52] U.S. Cl. .......................................... 179/84 VF
[51] Int. Cl.² .......................................... H04M 1/50
[58] Field of Search .............. 179/84 VF; 328/138, 328/139, 140; 324/78 D

[56] References Cited
UNITED STATES PATENTS

| | | | |
|---|---|---|---|
| 3,454,720 | 7/1969 | Minchenko | 179/84 VF |
| 3,537,001 | 10/1970 | Friend | 179/84 VF |
| 3,790,720 | 2/1974 | Schartmann | 179/84 VF |
| 3,912,869 | 10/1975 | Ullakko | 179/84 VF |

Primary Examiner—Kathleen H. Claffy
Assistant Examiner—Joseph A. Popek
Attorney, Agent, or Firm—McCormick, Paulding & Huber

[57] ABSTRACT

A decoder is disclosed for use in a communication system wherein bits of information are conveyed by the transmission, on a communication line, of code tones of distinctive frequencies each corresponding to a respective bit of information. The decoder divides an incoming signal into repetitive intervals having durations dependent on the period of the signal and provides digital measurements of the length of the interval by counting clock pulses during each interval. The digital measurements are then processed to test for persistence of the signal at a stable frequency for a predetermined time and for matching of said stabilized frequency to a recognized code tone frequency. More specifically, such decoder is disclosed as part of a larger decoder for use in, for example, a telephone communication system wherein dial numbers or other characters are communicated by way of simultaneously transmitted code tone pairs.

23 Claims, 14 Drawing Figures

DIGITAL TONE DECODER

BACKGROUND OF THE INVENTION

This invention relates to decoders for detecting and identifying coded tone signals appearing on a communication line, and deals more particularly with such a decoder comprised primarily of digital data processing components whereby the decoder may be implemented, if desired, by large scale integrated circuits or other solid state devices.

Tone code communication systems, as the term is used herein, are systems wherein a selected set of signals of distinctively different frequencies, and referred to as code tones, are used to communicate an associated set of informational bits. When a particular bit of information is to be communicated, the transmitting station inserts onto a communication line the code tone corresponding to such information bit. The receiving station must, therefore, necessarily include a decoder for detecting the presence of code tones on the communication line and for identifying each such detected tone. A presently common example of a tone coded communication system is a touch dial telephone communication system wherein coded tone pairs, generated by a touch dial pad, are used to communicate dialing formation.

In the past, tone decoders used in receiving stations have generally been based on a set of frequency responsive devices, one for each code tone and such as a set of narrow band pass filters, essentially analog in nature. These decoders, because of the number of frequency responsive devices required and because of the analog nature of such devices, have been relative expensive to produce and susceptible to malfunction due to departures in the characteristics of the components from desired characteristics because of initial manufacturing errors or change of such characteristics through age and use. Further, it has been impossible to implement such decoders by way of low cost and space saving integrated circuit components.

A general object of this invention is, therefore, to provide a tone decoder for use in a coded tone communication system for detecting and identifying coded tones and which decoder utilizes a minimum of analog or linear type circuit components and instead is comprised principally of components of the digital data processing type which may be made by integrated circuit or other solid state techniques.

A further object of this invention is to provide a tone decoder especially adapted for use in a touch dial telephone communication system or the like wherein communicated characters are transmitted by way of simultaneous tone pairs, the decoder utilizing principally digital data processing techniques and components.

Other objects and advantages of the invention will be apparent from the following description of a preferred embodiment of the same and from the drawings forming a part hereof.

SUMMARY OF THE INVENTION

The invention resides in a basic decoder assembly for detecting and identifying code tones appearing on a communication line. A zero crossing detector detects the zero crossings of an input signal and counts such zero crossings to produce period dependent interval marking pulses. A duration measuring circuit in turn provides a digital measurement of each interval by counting clock pulses between successive interval marking pulses. The most recent interval measurements are temporarily held in a store, such as a series shift register. A digital processor then processes the measurements in the store as each new measurement is made. This processing includes a comparison of each of the $n$ most recent interval measurements with the average value of such last $n$ measurements to test whether the input signal has persisted for a given amount of time at a stabilized frequency. Also, a test number having a magnitude dependent on the stored measurements is compared with a set of reference numbers defining separated magnitude ranges corresponding respectively to a plurality of code tones, and the input signal is declared a valid code tone if the test number falls within one of such magnitude ranges, provided the first comparison shows that the signal has persisted at a steady frequency for the predetermined time. If the input signal is declared a valid code tone, it is identified and its identity made available as by storage in an output register.

The invention also resides in a more complex code tone decoder adapted for use in a communication system employing simultaneously transmitted code tone pairs for representing communicated characters or other bits of communicated information. Such decoder includes two decoder channels, one for detecting and identifying code tones of a low frequency group and the other for detecting and identifying code tones of a high frequency group. A filter in advance of the two channels splits an input signal into a low frequency component transmitted to the low frequency channel and a high frequency component transmitted to the high frequency channel. Processing of the interval measurements stored in the low frequency channel store and of the interval measurements stored in the high frequency channel store is executed by a single digital processor time-shared by the two channels.

BRIEF DESCRIPTION OF THE DRAWINGS

FIG. 5b and FIG. 6b are to be placed relative to one another to form FIG. 5 and FIG. 6.

DETAILED DESCRIPTION OF PREFERRED EMBODIMENT

Figure 1:
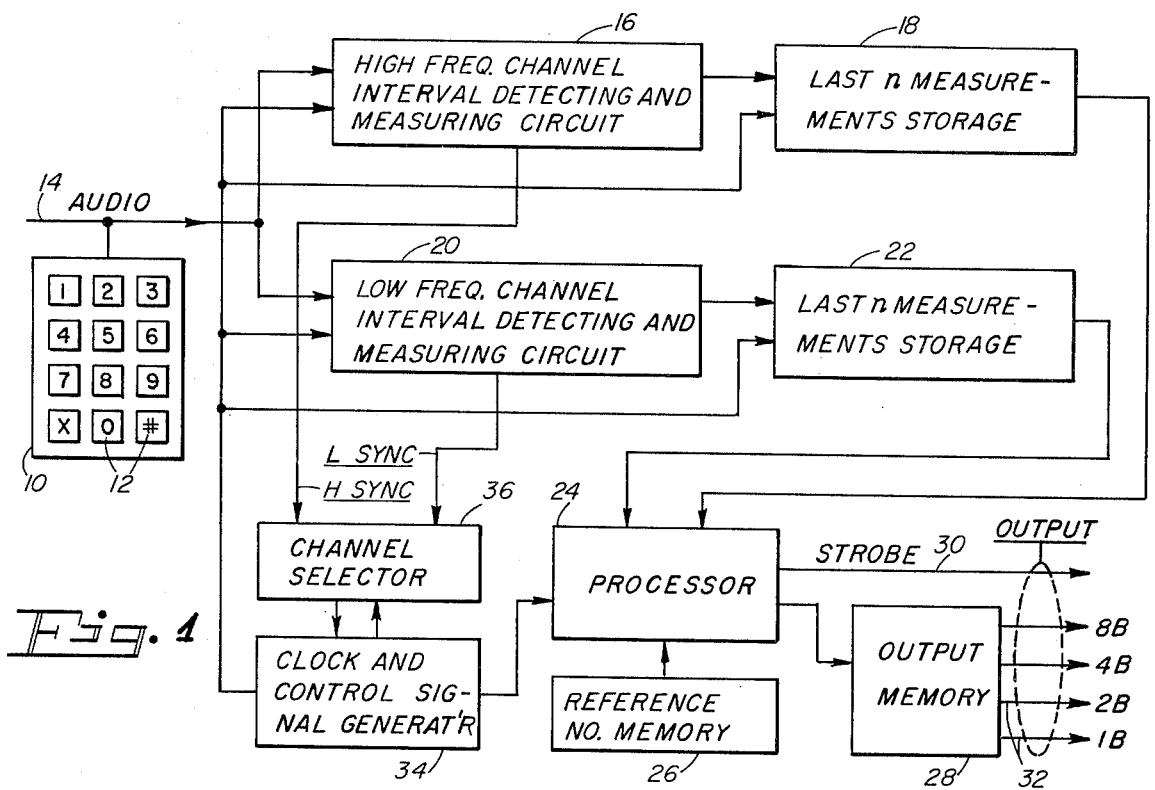
FIG. 1 is a block diagram showing the general organization of a tone decoder embodying this invention and adapted for use with a communication system wherein dial numbers or other characters are communicated by simultaneously transmitted code tone pairs.

General Organization - FIG. 1

FIG. 1 shows the general organization of a tone decoder embodying this invention and adapted for use in a touch dial telephone communication system or the like where dial characters or other bits of information are represented on a communication line by simultaneously appearing pairs of code tones. The code tones are tones of predetermined and distinctively different standardized frequencies. Each simultaneously transmitted tone pair includes one tone selected from a group of high frequency code tones and the other tone of the pair is one selected from a group of low frequency code tones.

In particular, the tone decoder of FIG. 1, and as described hereinafter in more detail, is designed for use with tones coded in accordance with present touch dial telephone standards. These code tones and the dial characters represented by each tone pair are shown below in Table No. 1.

Table No. 1

|  | 1209Hz | 1336Hz | 1477Hz | 1633Hz |
| --- | --- | --- | --- | --- |
| 697Hz | 1 | 2 | 3 | $C_1$ |
| 770Hz | 4 | 5 | 6 | $C_2$ |
| 852Hz | 7 | 8 | 9 | $C_3$ |
| 941Hz | * | 0 | No. | $C_4$ |

In Table No. 1, the code tones of the high frequency group, four in number, appear at the head of the table and the code tones of the low frequency group, four in number, appear at the left-hand side of the table. The other characters in the table are those represented by various tone pairs. Thus, the 770Hz code tone combined with the 1336Hz code tone represent the character 5, and the 852Hz code tone combined with the 1209Hz code tone represent the character 7. At present, most touch dial pads in use contain either a total of ten keys associated respectively with the ten numeric characters 1 to 0; or a total of twelve keys associated respectively with the ten numeric characters 1 to 10, the "*" character and the "#" character. In either case, only three high frequency code tones and four low frequency code tones are used to communicate the ten or twelve dial characters represented by the keys, the 1633Hz high frequency code tone of Table No. 1 remaining unused. However, if all eight code tones of Table No. 1 are used, instead of only seven, four additional characters may be communicated and four corresponding character keys added to the touch dial pad. In Table No. 1, these four optionally available characters are indicated by the designations C1, C2, C3 and C4. The tone decoder of this invention, as described hereinafter, is adapted to detect and identify all four high frequency code tones and all four low frequency code tones of Table No. 1, and to therefore be capable of use in systems for communicating as many as sixteen characters.

In FIG. 1 the reference character 10 indicates a conventional telephone touch dial pad, at a transmitting or calling station, having a set of twelve keys 12, 12 arranged in accordance with the scheme of Table No. 1, the keys representing respectively the numeric characters 1 to 0, the "*" character and the "#" character. In this case no keys are provided for use with the 1633Hz high frequency code tone, but the decoder, as mentioned, nevertheless has the capacity to decode tone pairs including the 1633Hz tone so as to be optionally usable with a thirteen to sixteen key pad, instead of the illustrated twelve key pad, if desired, without modification. When each of its keys is depressed, the pad 10 generates the tone pair identifying the depressed key, according to the combinational code of Table No. 1, and injects such tone pair onto an associated audio communication line 14. The remainder of FIG. 1 illustrates the general organization of the tone decoder of this invention, located at a receiving or called station, for detecting and identifying the code tones appearing on the communication line 14 and generated by the illustrated touch dial pad 10 or other similar touch dial pads at other sending stations having sending access to the line 14.

The decoder of FIG. 1 has a data acquisition and storage section which is divided into two channels, the first being a high frequency channel for handling signals of a high frequency range embracing the high frequency code tone group, and the other being a low frequency channel for handling signals of a low frequency range embracing the low frequency code tone group. The high frequency channel consists of an interval detecting and measuring circuit 16 and a memory or store 18 for temporarily storing the last $n$ interval measurements made by the measuring circuit 16. The interval detecting and measuring circuit 16 functions to extract from the signal appearing on the input communication line 14 a high frequency channel input signal consisting of all frequency components of the signals on the line 14 falling within a high frequency range or pass band embracing all of the high frequency code tones but excluding all of the low frequency code tones. The circuit 16 responds to the high frequency channel input signal by detecting and marking intervals the durations of which are dependent on the current periods of the high frequency channel input signal, whereby the duration or length of each interval is inversely related to the current frequency of the signal. In particular, in the illustrated case, the intervals detected by the circuit 16 are each equal to a predetermined integral number of periods of the high frequency channel input signal. The circuit 16 further also functions to provide a digital measurement of each detected interval and each such measurement, as it is made, is transferred to the temporary store 18. As each new interval measurement is added to the store, the oldest is discarded, so that only the last $n$ measurements are preserved.

The low frequency channel of the data acquisition and storage section of the decoder of FIG. 1 is similar to that of the high frequency channel and includes a low frequency channel interval detecting and measuring circuit 20 and an associated interval measurement store 22. The low frequency channel interval detecting and measuring circuit 20 is similar to the high frequency channel circuit 16 except that it is designed to extract from the communication line 14 a low frequency channel input signal consisting of all frequency components of the signal on the line 14 falling within a low frequency range or pass band embracing the low frequency code tones and excluding the high frequency code tones. Further, the intervals detected by the low frequency channel circuit 20 preferably consist of a smaller number of periods than the intervals detected by the high frequency channel circuit 16 with the number of periods in each high frequency channel interval being so related to the number of periods in each low frequency channel interval that the intervals detected by the two circuits 16 and 20 are roughly of the same durations and the associated digital measurements are accordingly of roughly the same order of magnitude. The store 22 associated with the low frequency channel circuit 20 stores the last $n$ measurements made by the circuit 20 and as each new measurement is made the oldest is discarded.

The decoder of FIG. 1 processes the set of measurements stored in the high frequency channel store 18 to determine whether such set of measurements indicates the receipt by the decoder of a tone meeting predescribed conditions necessary for it to be recognized and identified as a valid high frequency code tone. Likewise, the set of measurements stored in the low frequency channel store 22 are processed to determine whether such set indicates the receipt by the decoder of a tone meeting predescribed conditions necessary for it to be recognized and identified as a valid low frequency code tone.

Within the broader aspects of the invention, two separate processors, one for each of the high and low frequency channels of the data acquisition and storage section, could be provided for processing the measurements stored in the high frequency store 18 and low frequency store 20. Preferably, however, and as shown and described herein, the decoder includes a single processor 24 which is time shared between the two channels so as to alternately process the measurements stored in one of the stores and then the measurements stored in the other store. The time required for processing each set of measurements from either the store 18 or the store 22 is sufficiently short with respect to the duration of the intervals detected by the high frequency channel circuit 16 or the low frequency channel circuit 20 that sufficient time is available to assure processing of each set of stored measurements as each new interval measurement is made.

The conditions necessary for a tone to be recognized and identified as a valid code tone are two in number. The first condition is that the detected tone has persisted at an acceptably stable frequency for a predetermined time. The second is that the frequency of such persisting tone match, within a prescribed tolerance, one of the standard code tone frequencies.

The processor 24 determines the presence or absence of the first condition by performing a test, referred to herein as a "slew" test, where the $n$ recent measurements of the set of stored measurements undergoing processing, are effectively compared with each other to determine whether they are all of substantially the same magnitude. If all of the measurements of the set are found, by this test, to be of substantially the same magnitude, within a prescribed tolerance range, the test is taken to be satisfied. The slew test may be made in various ways but preferably, and as described herein, is performed by summing the $n$ measurements of the set, by multiplying each measurement of the set by $n$ and by comparing the sum with each of the $n$ products. If the absolute magnitude of the difference between the sum and each of the $n$ products is less than a given number the test is satisfied.

The processor 24 determines the presence or absence of the second condition by a test, referred to herein as a "validity" test. This validity test includes (1) deriving a test number from the $n$ measurements contained in the involved store 18 or 22, and (2) comparing this test number with a list of reference numbers defining a plurality of ranges of acceptable magnitudes, each of which acceptable magnitude ranges corresponds to a respective one of the code tones of the related high or low frequency group, and which acceptable magnitude ranges are separated from one another by interposed ranges of unacceptable magnitudes, to determine whether the test number falls within one of the acceptable magnitude ranges. The test number is one having a magnitude dependent on the magnitudes of at least some of the $n$ measurements of the involved set. Since, if the slew test is passed, all $n$ measurements of the set are of substantially the same magnitude, the test number could, for example, be the most recent measurement, any other of the measurements, or a quantity based on the sum or product of any one or more of the measurements. In the illustrated case, as hereinafter described, the test number is one having a magnitude based on the sum of the $n$ measurements of the involved set.

In FIG. 1, the reference numbers with which the test number is compared is supplied by a reference number store 26. This store supplies one list of high frequency channel reference numbers which are associated with the high frequency code tone group and used by the processor 24 during processing of interval measurements taken from the high frequency channel store 18, and a second set of low frequency reference numbers which are associated with the low frequency code tone group and used by the processor 24 during processing of interval measurements taken from the low frequency channel store 22.

If the validity test is satisfied, by the test number falling within an acceptable range of magnitudes, and if the slew test is also satisfied, the input signal to the corresponding high or low frequency channel is taken to be a valid code tone and it is identified by detecting the particular reference number magnitude range within which the test number falls.

In alternately processing the sets of interval measurements from the high frequency channel store 18 and the low frequency channel store 22, when a valid tone code is detected in one channel its identity is transferred to an output memory 28. Subsequently when a valid tone code is detected in the other channel, its identity is also transferred to the output memory 28. Upon the detection of a code tone from each channel and the transfer of both of their identities to the output memory 28, a strobe signal is produced by the processor 24 on the line 30. This strobe signal indicates to a utilization device that the output memory 28 now contains two valid, high and low frequency, code tones combinatorially representing a dial number or other communicated character. Preferably, the output memory 28 includes a decoder for decoding the two code tone identities into a four bit binary coded number appearing on four output lines 32, 32 and representing the communicated character. The signals appearing on these four output lines 32, 32 and on the strobe line 30 comprise the output of the tone decoder.

In addition to the above-described generalized components, the decoder of FIG. 1 also includes a clock and control signal generator 34 and a channel selector circuit 36. The clock and control signal generator 34 provides clock pulses which are counted by counters in the circuits 16 and 20 for measuring the associated intervals. It also provides other clock and control signals for controlling the operation of the processor 24 and the transfer of data within and between the various components as explained in more detail hereinafter. The channel selector 36 controls the time sharing of the processor 24 between the high and low frequency channels of the data acquisition and storage section and is responsive to HSYNC and LSYNC interval marking pulses produced respectively by the interval detecting and measuring circuits 16 and 20.

DETAILED DESCRIPTION OF TONE DECODER - FIGS. 2 – 6

The tone decoder of this invention, as previously mentioned, is one employing digital data processing techniques. In keeping with this, it includes as a basic component the clock and control signal generator 34 of FIG. 1 for producing various clock and control signals controlling the operation of other components and the transfer of digital information within and between the components. Therefore, before discussing the other components some consideration should be given to the clock and control signal generator 34 and to the more basic clock and control signals produced thereby. For this purpose, reference may be had to FIG. 2 together with FIG. 5, FIG. 5 showing the set of repetitive clock and control signals produced by the generator 34.

Figure 5A:
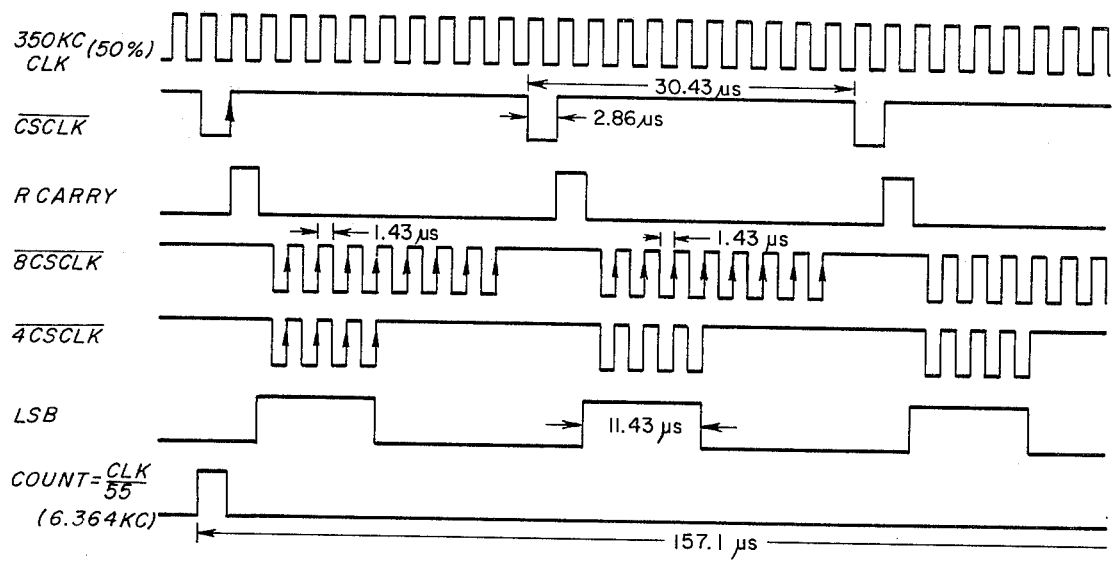
FIGS. 5a and 5b, when placed side by side as shown in FIG. 9, form a single figure, referred to hereinafter as FIG. 5, which is a diagram showing various repetitive clock and control signals produced by the clock and control signal generator section of the tone decoder of FIGS. 1 and 2.
Figure 5B:
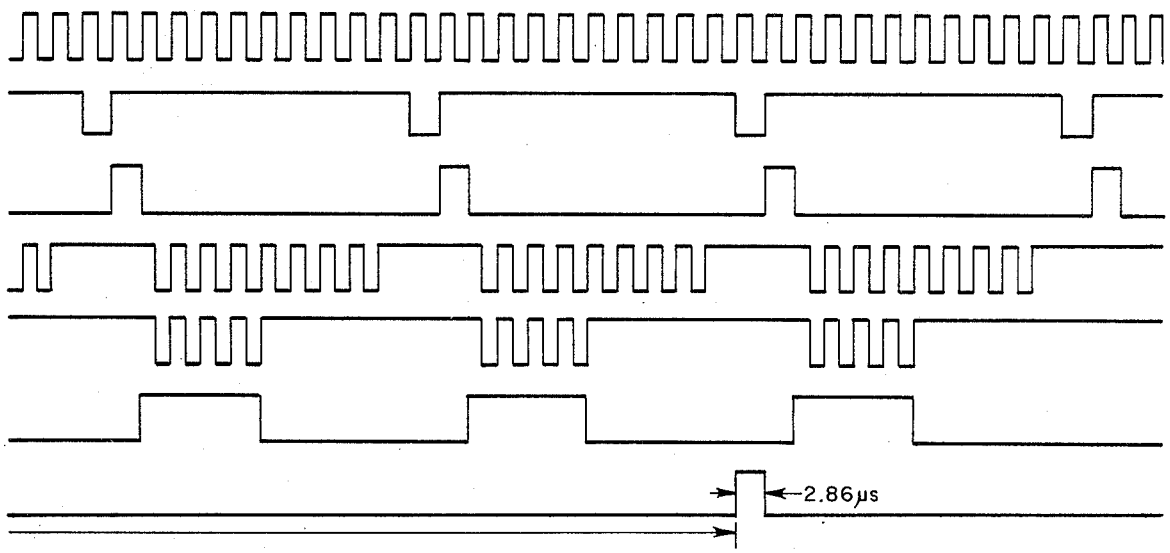

In particular, the generator 34 includes a 350kc stable frequency source clock 38 having a fifty percent duty cycle so as to produce the CLK signal of FIG. 5. This CLK signal is supplied to a divide-by-eleven circuit 40 and to a logic circuit 42. The output of the divide-by-eleven circuit 40 is fed both to the logic circuit 42 and to a dividy-by-five circuit 55. The output of the divide-by-five circuit 55 is the COUNT signal of FIG. 5 consisting of one positive pulse of 2.86μs. duration occurring during each 157.1μs. period. The control signals produced by the logic 42 are the illustrated signals $\overline{CSCLK}$, LSB, 4CSCLK, 8CSCLK and RCARRY of FIGS. 2 and 5, the nature of which are clearly evident from FIG. 5.

Turning now to other components of the tone decoder and referring again to FIG. 2, the signal appearing on the audio communication line 14, and which may contain code tones, has a high frequency channel input signal and a low frequency channel input signal extracted therefrom by a high band pass filter 44 and a low band pass filter 46, respectively. The high band pass filter has a pass band embracing the frequencies of the high frequency group of code tones, but excluding the frequencies of the low frequency code tones, and the low band pass filter 46 has a pass band embracing the frequencies of the low frequency code tones, but excluding the frequencies of the high frequency code tones. The high band pass filter 44 is at the input of the high frequency channel interval detecting and measuring circuit 16, and likewise the low band pass filter 46 is at the input of the low frequency channel interval detecting and measuring circuit 20. The two circuits 16 and 20 are substantially identical, except as hereinafter described, and therefore the construction of both may be understood by considering only one in detail. For this purpose, the high frequency channel circuit 16 is chosen.

Figure 2B:
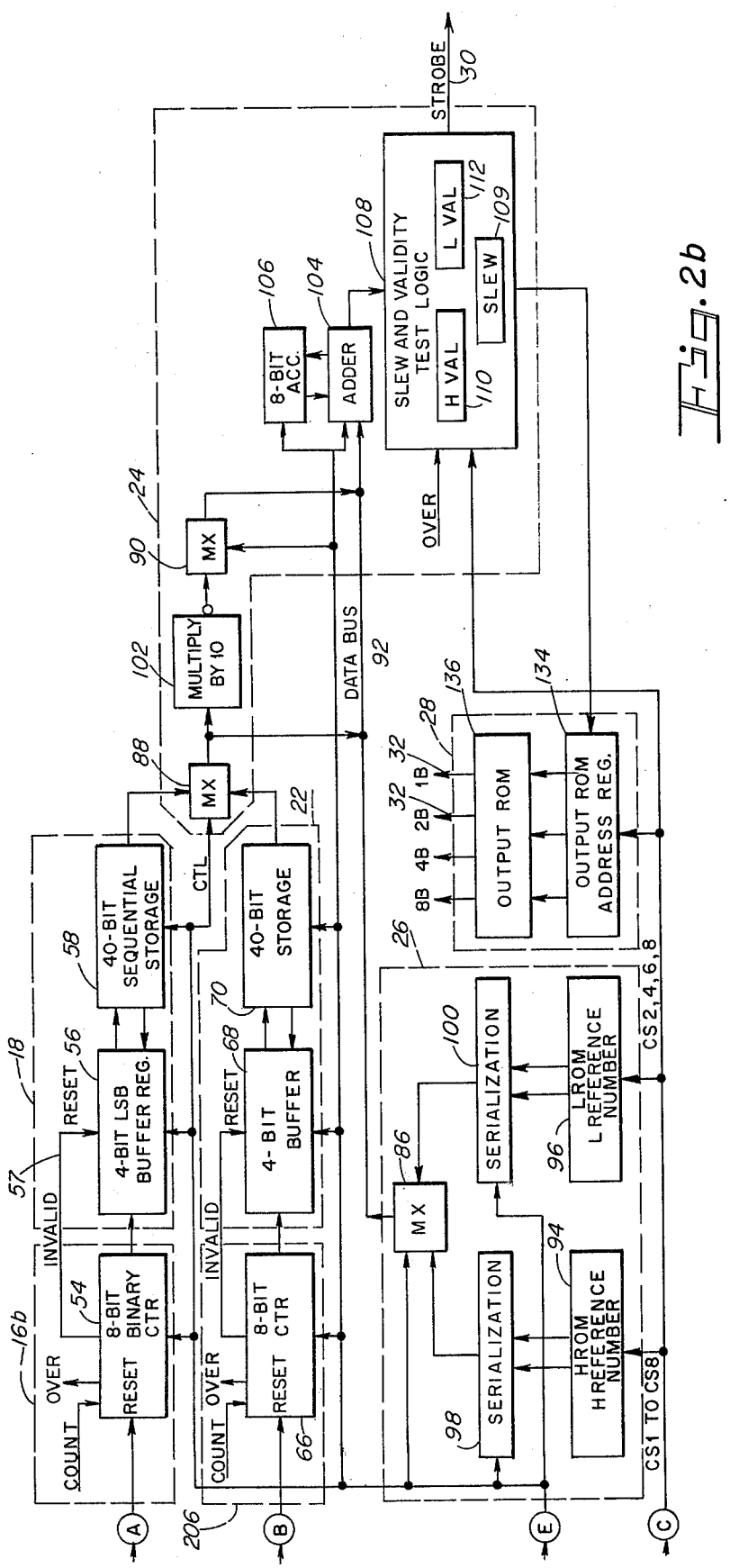
FIGS. 2a and 2b, when placed together as shown in FIG. 8, form a single figure, referred to hereinafter as FIG. 2, which is a block diagram showing in more detail the construction of the tone decoder of FIG. 1.
Figure 2A:
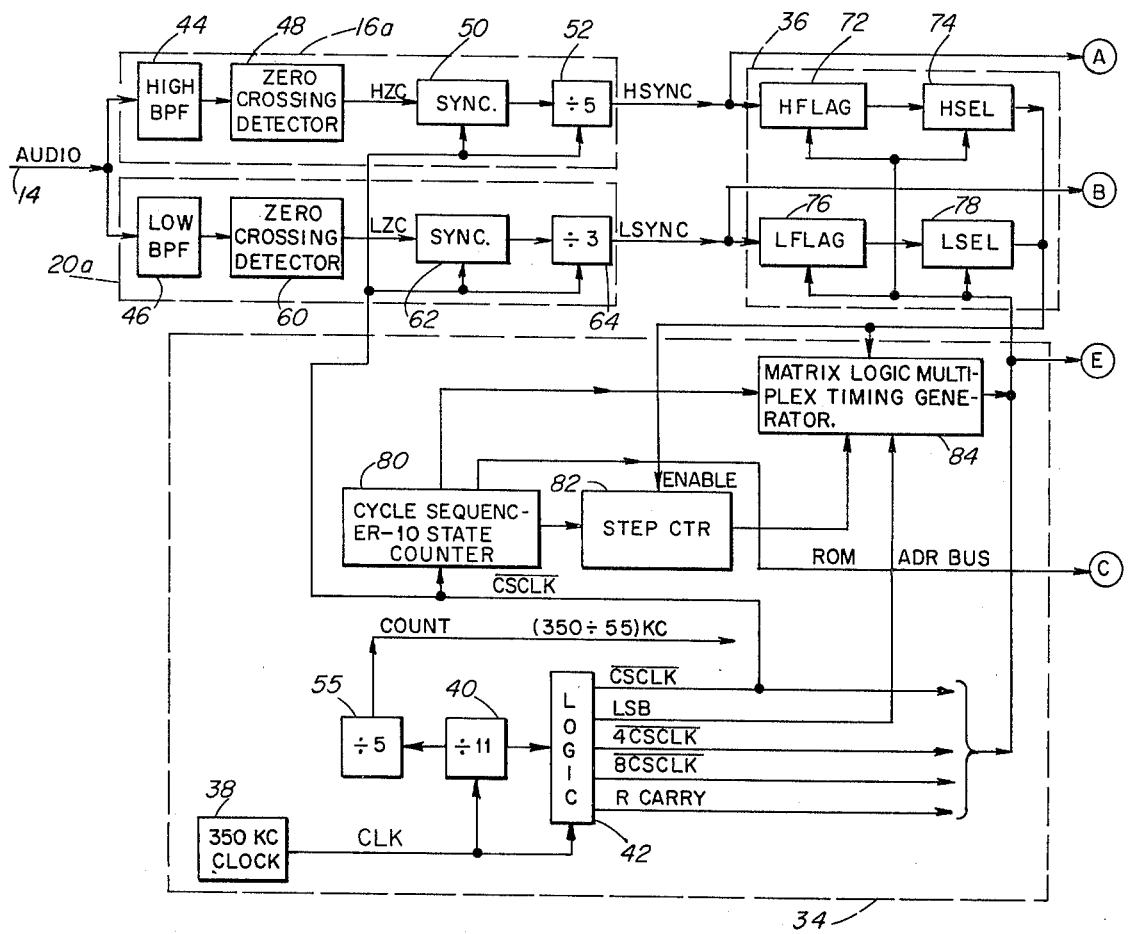
Figure 8:
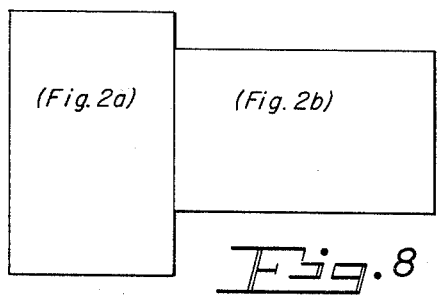
FIG. 8 is a diagram showing how the sheet bearing FIG. 2a and the sheet bearing FIG. 2b are to be placed relative to one another to form FIG. 2.
Figure 10:
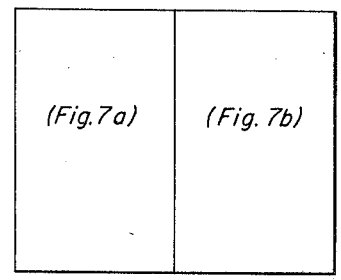
FIG. 10 is a diagram showing how the sheet bearing FIG. 7a and the sheet bearing FIG. 7b are to be placed relative to one another to form FIG. 7.
Figure 9:
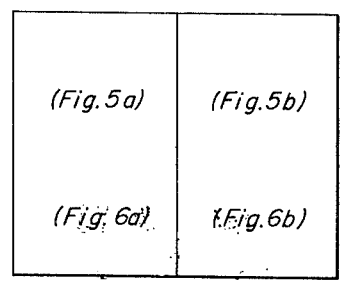
FIG. 9 is a diagram showing how the sheet bearing FIG. 5a and FIG. 6a and the sheet bearing

In FIG. 2, the circuit 16 is shown divided into two parts 16a and 16b, the part 16a being the interval detecting circuit and the part 16b being the interval measuring circuit. The interval detecting circuit 16a, in addition to the high band pass filter 44, includes a zero crossing detector 48, a synchronizer 50 and a divide-by-five circuit 52. Typical output signals from the various components of the interval detecting circuit 16a are shown by FIG. 3.

Figure 3:
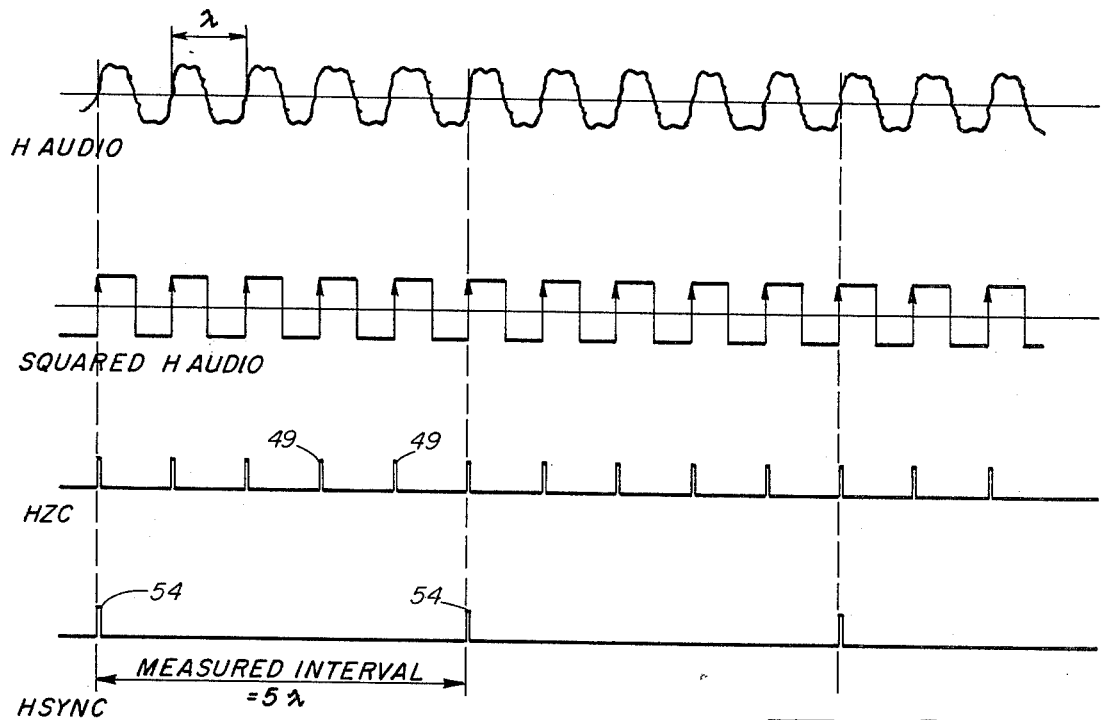
FIG. 3 is a diagram showing an example of an input signal to one of the channels of the decoder of FIGS. 1 and 2 and also showing various related signals produced in response to the input signal by components located near the input of the channel.

In FIG. 3, the HAUDIO signal is the output from the high band pass filter 44 and is the raw input signal to the high frequency channel. (A similar LAUDIO signal, not shown, is the output of the low pass band filter 46 and is the raw input signal to the low frequency channel.) This HAUDIO signal may have any frequency within the pass band of the high band pass filter and a correspondingly variable period. In FIG. 3, one period of the HAUDIO signal is indicated as λ. The zero crossing detector 48 detects the positive-going zero crossings of the HAUDIO signal and produces an output signal HZC including one pulse 49 for each such zero crossing. In particular, the zero crossing detector 48 includes a circuit for converting the HAUDIO signal, by hard limiting, to a square wave, SQUARED HAUDIO, and a monostable multivibrator or the like for deriving the HZC signal from the SQUARED HAUDIO signal by producing one pulse 49 for each positive-going edge of SQUARED HAUDIO.

The synchronizer 50 synchronizes the pulses of the HZC signal with the negative pulses of $\overline{CSCLK}$. That is, when a pulse 49 of the HZC signal occurs, the synchronizer selects and delivers the next $\overline{CSCLK}$ pulse as a synchronized HZC pulse. In any event, for each HZC pulse 49 input to the synchronizer a corresponding output pulse, referred to as a synchronized HZC pulse and synchronized with a $\overline{CSCLK}$ pulse, is produced and transmitted to the divide-by-five circuit 52. The divide-by-five circuit 52 produces the HSYNC signal of FIG. 3 consisting of one HSYNC pulse 54 for each five synchronized HZC pulses supplied thereto. Although an HSYNC pulse occurs slightly after the HZC pulse which caused it, the delay is too small to be shown in FIG. 3. It will therefore be understood that the HSYNC pulses 54, 54 of the HSYNC signal are pulses marking repetitive intervals dependent on the frequency and period of the HAUDIO signal, each interval in particular being equal to five periods λ of HAUDIO. Accordingly, the duration of each interval is related by a simple mathematical equation to the average frequency of the HAUDIO signal during such interval and a representation of such average frequency may be gotten by measuring the interval.

The HSYNC pulses constitute the output from the interval measuring circuit 16a and, as mentioned, mark repetitive intervals of the HAUDIO signal each having a duration equal to five periods of the HAUDIO signal. The interval measuring circuit 16b measures each one of these repetitive intervals by counting clock pulses which are specifically the pulses of the COUNT signal. As evident from FIG. 5, each COUNT pulse is of 2.86μs. duration and one such pulse is produced every 55 cycles of the CLK signal, giving the COUNT signal a 157.1μs. period. The counting means of the circuit 16b is an eight bit binary counter 54. This counter is reset by each HSYNC pulse and counts pulses of the COUNT signal between successive HSYNC pulses. If the counter 54 overflows before being reset an overflow signal, designated OVER, is produced. At each HSYNC pulse, before the counter is reset, a transfer of information is made to a four bit buffer register 56 constituting part of the high frequency channel interval measurement store 18. The information transferred to the buffer register 56 depends on the states of the fifth, sixth, seventh and eighth bits held by the counter, these being the four most significant bits. In particular, if the fifth bit is 1 and the sixth, seventh and eighth bits are all 0's, then the four least significant bits held by the counter are transferred in parallel to the four bit buffer 56. If the fifth bit held by the counter is O, or if the fifth bit is 1 and the sixth, seventh and eighth bits are not all 0's, then four 0's are transferred to the buffer 56. That is, if the decimal equivalent of the counter content is greater than fifteen and less than thirty-two, then the four least significant bits held by the counter are transferred to the buffer, but if the decimal equivalent of the counter content is less than sixteen or greater than 31, four 0's are transferred to the buffer.

The reason for the conditional transfer or either 0's or only the four least significant bits of actual count information to the buffer register 56 will be evident from Table No. 2 presented hereinafter (on page 35) and is that if an interval measurement made and represented by the count of the counter 54 pertains to one of the high frequency code tones, the count in the counter will necessarily have to be greater than fifteen and less than 32. Accordingly, a transfer of all 0's to the buffer register indicates that the related measurement cannot be indicative of the receipt of a code tone by the decoder, whereas the transfer of the four least significant bits of the counter content to the buffer register indicates that the transferred information may be indicative of a code tone. The four least significant bits, if transferred, represent a number related by its magnitude to the frequency of the tone under investigation. Since a 1 must be present in the fifth bit of the counter, and 0's in the sixth, seventh and eighth bits, in order for the four least significant bits to be transferred, the fifth bit of the counter content need not be transferred, it being recognized that the four bits which are transferred represent a five bit binary number the four least significant bits of which are the transferred bits and the fifth of which is a 1. In other words, the four bit number transferred to the buffer register 56 is, in decimal terms, the count or content of the counter minus sixteen.

As mentioned, the transfer of the four least significant bits of the counter 54 to the buffer register 56 occurs just before the counter is reset by a HSYNC pulse. The loading of all 0's rather than the four least significant bits is accomplished by a logic circuit, not shown, which, just before resetting of the counter, produces an INVALID signal on the line 57 unless the fifth bit of the counter is a 1 and the sixth, seventh and eighth bits are all 0. This INVALID signal is applied to the reset terminal of the register 56 so as to inhibit the attempted transfer of the four least significant bits and to effect the loading of all 0's into the buffer register. Whenever any new information, either the four least significant counter bits or all 0's, is loaded into the buffer register just before a resetting of the counter, the information then in the buffer register is destroyed and replaced by the new information.

The measurement store 18 of the high frequency channel includes the four bit buffer register 56 and a forty bit shift register 58. The forty bit register 58 is divided functionally into ten successive subregisters of four bits each. The forty bit register 58 and the four bit buffer register 56 may be connected to one another so as to comprise in combination a cascaded 44 bit circulating shift register serially storing eleven four bit binary numbers. These eleven numbers, before their processing begins and as will be evident hereinafter, correspond respectively to the last eleven interval measurements made by the counter 54.

Considering now the low frequency channel interval detecting and measuring circuit 20 and measurement store 22, these components contain parts which are constructed and function generally identically to corresponding parts of the corresponding high frequency channel circuit and need not be described in detail. In particular, the low frequency channel interval detecting circuit is indicated at 20a and, in addition to the low band pass filter 46 includes a zero crossing detector 60 and a synchronizer 62 identical respectively to the zero crossing detector 48 and synchronizer 50 of the high frequency channel circuit. However, in place of the divide-by-five circuit 52, the interval detecting circuit 20a includes a divide-by-three circuit 64 so that the output signal from the interval detecting circuit 20a is an LSYNC signal consisting of LSYNC pulses marking intervals each equal to three periods λ of the input LAUDIO signal derived from the low band pass filter 46 and supplied to the zero crossing detector 60. The inverval measuring circuit 20b of the low frequency channel is identical to the similar circuit 16b of the high frequency channel and consists of an eight bit binary counter 66 identical to the counter 54. Likewise, the low frequency channel store 22 is identical to the high frequency channel store 18 and consists of a four bit buffer register 68 identical to the register 56 and a forth bit serial shift register 70 identical to the register 58.

After each interval measurement, in the case of both the high frequency channel components and the low frequency channel components, and while the next interval is being measured, the processor 24 processes the information contained in the associated store 18 or 22. That is, each time either one of the stores 18 or 22 is updated by a new interval measurement, the contents of the store are again processed. The assignment of the processor 24 to the processing of the stores 18 and 22 on a time shared basis is controlled by the channel selector circuit 36 in response to the HSYNC and LSYNC interval marking pulses. As shown in FIG. 2, this selector includes an HFLAG flip-flop 72 and an HSEL flip-flop 74 for the high frequency channel and an LFLAG flip-flop 76 and an LSEL flip-flop 78 for the low frequency channel. The HFLAG flip-flop 72 is set by an HSYNC pulse and the LFLAG flip-flop 76 is set by an LSYNC pulse.

As discussed in more detail hereinafter, the processor 24 has four different states. These are a waiting or NOP state and three active states referred to as OP1, OP2 and OP3, respectively. States OP1, OP2 and OP3 are executed in sequence and during one run of these three active states, one set of stored measurements from either the store 18 or the store 22 is completely processed. At the end of the OP3 state, the processor returns to the NOP state. If upon return of the processor to the NOP state, HFLAG only is set, HSEL is set, and this assigns the processor to the high frequency channel and initiates processing of the measurements then stored in the high channel measurement store 18. If upon return of the processor to the NOP condition, only LFLAG is set, then KSEL is set, and this assigns the processor to the low frequency channel and initiates processing of the information then contained in the low frequency channel store 22. If upon return of the processor to the NOP state, both HFLAG and LFLAG are set, the high frequency channel is given priority and HSEL is set to assign the processor to the high frequency channel and to initiate processing of the high frequency channel data in the store 18. That is, if both channels are ready for processing when the processor becomes available for reassignment, the high frequency channel is selected first. If, when the processor returns to NOP state neither FLAG is set, the processor remains in that state until at least one FLAG is set. When either FLAG is set, the corresponding SEL is also set and the processor subsequently goes to the OP1 state. If both FLAG's are set simultaneously, HSEL is set and LSEL is not. Suitable logic gates readily evident to those skilled in the art and not shown in FIG. 2 are of course provided between the HFLAG and LFLAG flip-flops and the HSEL and LSEL flip-flops to provide for the setting of the HSEL and LSEL flip-flops in accordance with the conditions stated. At the beginning of OP1 of the processor the FLAG flip-flop of the selected channel is reset and at the end of OP3 the SEL flip-flop of the selected channel is reset.

In advance of further consideration of the processor 24, a further discussion of the clock and control signal generator 34 and of additional output signals produced thereby for controlling the operation of the processor is in order. For this, reference is made again to FIG. 2 and to FIG. 6.

Figure 6A:
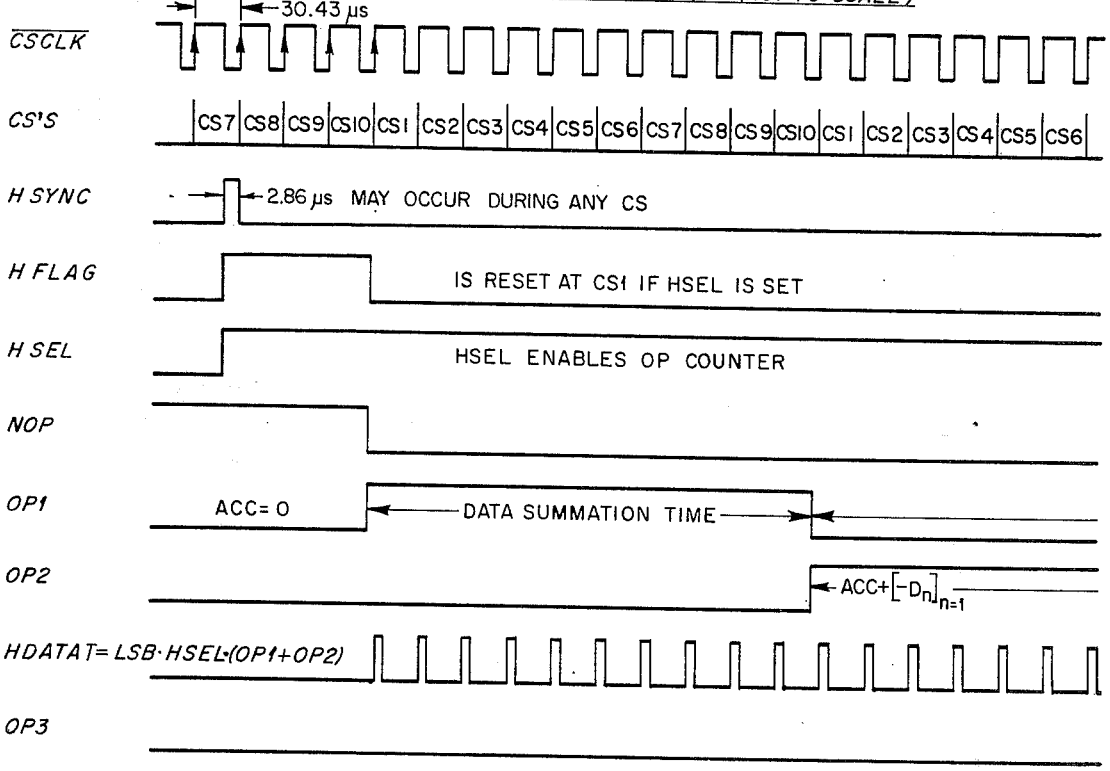
FIGS. 6a and 6b, when placed side by side as shown in FIG. 9, form a single figure, referred to hereinafter as FIG. 6, which is a diagram showing further control signals generated by the clock and control signal generator section of the tone decoder of FIGS. 1 and 2.
Figure 6B:
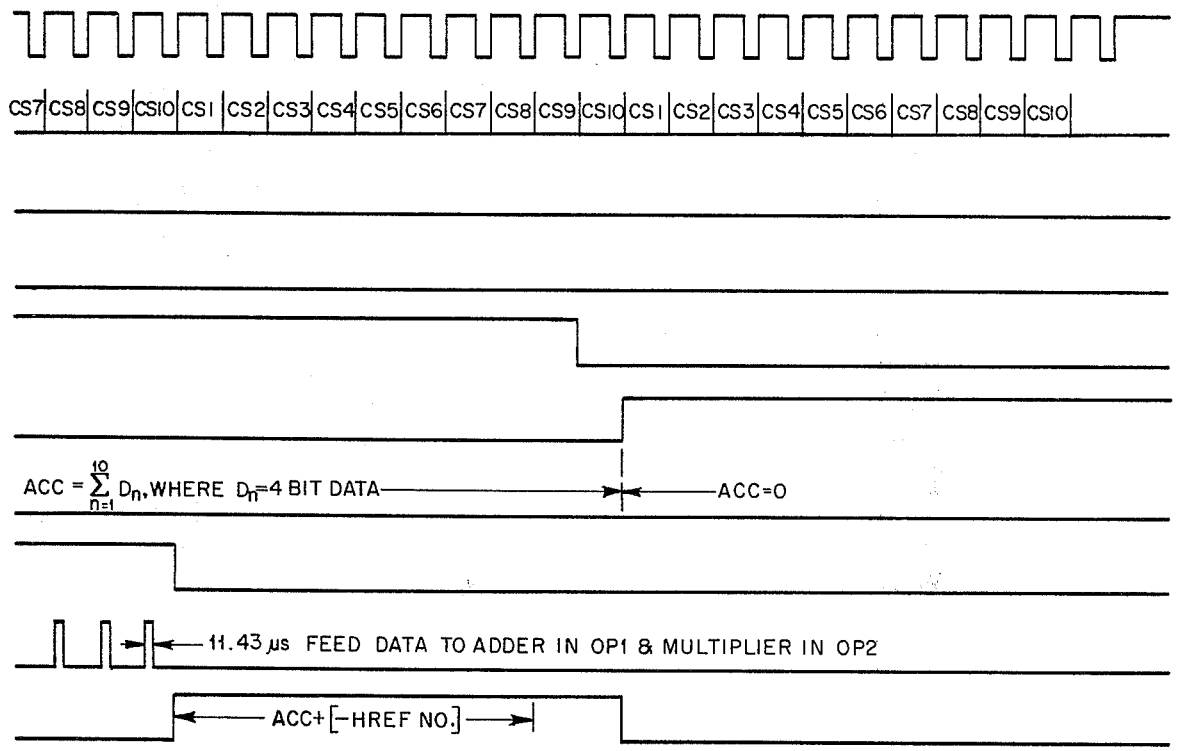

In addition to the components previously mentioned, the clock and control signal generator 34 of FIG. 2 includes a cycle sequencer 80 in the form of a ten-state counter. The ten states of the sequencer 80 to produce ten related control signals designated CS1 and CS10, respectively. The sequencer 80 is responsive to the $\overline{CSCLK}$ signal and advances sequentially from one state to the next upon each positive going edge of the $\overline{CSCLK}$ signal, as shown in FIG. 6. The cycle sequencer 80 runs continuously in response to the continuously supplied $\overline{CSCLK}$ signal and following each CS10 state returns to the CS1 state. Associated with the cycle sequencer 80 is a four state step counter 82, the four steps or states of which correspond to and dictate the four operational states of the processor 24. That is, the four sequential states of the counter 82 designate respectively the NOP, OP1, OP2 and OP3 states of the processor and the counter is sequentially shifted through these states in response to pulses from the cycle sequencer 80. Advancement of the step counter from one step is the next is, however, permitted only when the counter is enabled by a signal from the HSEL flip-flop 74 or the LSEL flip-flop 78. That is, when either one of the SEL flip-flops 74 or 78 is set, the HSEL or LSEl signal is transmitted as an enabling signal to the step counter 82 enabling it to advance upon receipt of the next advance signal from the cycle sequencer 80. Such advance signal is produced each time the cycle sequencer 80 shifts from the CS10 state. Initially, before the receipt of an enable signal, the step counter 82 will be in the NOP state. Following the receipt of an enable signal the counter 82 shifts from the NOP state to the OP1 state at the beginning of the next CS1 signal, it shifts from the OP1 state to the OP2 state at the beginning of the second next CS1 signal, it shifts from the OP2 state to the OP3 state at the beginning of the third next CS1 signal, and finally it shifts back to the NOP state from the OP3 state upon the fourth next CS1 signal. Each of the active states OP1, OP2 and OP3 therefore is present for a full cycle of ten sequential control signals CS1 to CS10.

FIG. 6 shows the various signals discussed in the immediately preceding paragraphs and assumes that the operation of the processor in initiated by a HSYNC pulse which sets HFLAG and HSEL. An LSYNC pulse initiates the same timing as shown in FIG. 6 except that in the case of a HFLAG and LFLAG both being set when NOP reappears HFLAG takes priority and sets HSEL.

Returning to FIG. 2, the clock and control signal generator 34 also includes a matrix logic multiplex timing generator 84 which produces control signals for multiplexers 86, 88 and 90 which in turn control the transfer of data from various components to a common data bus 92. The multiplex timing generator 84 has as one input thereto the outputs of the HSEL and LSEL flip-flops. This input informs the generator of which channel store 18 or 22 has been selected for processing. Another input is the output of the step counter 82 which informs the generator 84 of the operational state, NOP, OP1, OP2 or OP3, of the processor. Another input is the output of the cycle sequenver 80 which informs the generator of the present control signal CS1 to CS10; and a final input signal is the LSB signal from the logic 42 which determines when during the duration of each control signal data transfer is to be made during OP1 and OP2. In response to these input signals, the logic of the timing generator 84 produces proper control signals for causing the multiplexers 86, 88 and 90 to pass the desired data to the data bus 92 at the proper times, as will be well understood to those skilled in the art. By way of example, one multiplexer control signal is shown in FIG. 6 and is referred to as HDATAT. This control signal is applied to the multiplexer 88 and causes that multiplexer, during each HDATAT pulse to gate the high frequency channel store 18 output to the data bus 92 during OP1 and to the hereinafter described multiplexer 102 during OP2. During each HDATAT pulse a burst of $\overline{4CSCLK}$ occurs and this, in response to HDATAT and OP1, is applied to the buffer register 56 and to the shift register 58 is circularly shift the contents of the combined or cascaded register four bit positions in the FIFO (first in first out) direction, the four end around bits being serially supplied to the multiplexer 88 for transfer to the data bus 92. During OP2, the buffer register 56 is diassociated, as far as shifting is concerned, from the shift register 58 and only the contents of the shift register 58 are circularly shifted. Also in OP2, the four end around bits occurring during each HDATAT pulse are directed by the multiplexer 88 to the multiplier 102 and the resulting output of the multiplier is directed by the multiplexer 90 to the data bus 92.

Turning now to the reference number store 26 of FIG. 2, this unit consists of two read only memories, HROM 94 and LROM 96, which respectively store a list of reference numbers for testing the validity of tones detected by the high frequency channel and a list of reference numbers for testing the validity of tones detected by the low frequency channel. Each reference number is an eight bit number stored in one's complement form, and associated with each ROM 94 or 96 is a serialization circuit 98 or 100 for extracted an addressed one of the eight bit numbers from the associated ROM and for serially presenting it to the data bus 92 through the multiplexer 86. Each such extraction and serialization is controlled by one burst of the 8CSCLK signal of FIG 5.

Turning next to the processor 24, this unit includes a serial multiply-by-ten multipler 102, a serial full adder 104, an eight bit accumulator 106, and a slew and validity test logic circuit 108 including a SLEW flip-flop 109, an HVAL flip-flop 110 and a LVAL flip-flop 112. To consider the functioning of these components, the steps performed by the processor during one complete run or cycle of its three active states will not be described and for this purpose it will be assumed that the store selected for processing is the high frequency channel store 18.

Prior to the beginning of OP1, the store 18 is in such a state that the buffer register 56 contains a number corresponding to the most recent interval measurement. The forty bit register 58 contains, in sequence, ten four bit numbers corresponding to the next ten most recent interval measurements. If the buffer register 56 is taken to be to the left of the shift register 58, as shown in FIG. 2, the oldest four bit interval measurement number is stored in the rightmost four bits or the register 58. During OP1, the buffer register 56 is cascaded with the shift register 58 and the contents of the cascaded register so formed are shifted four bit positions to the left, by a burst of 4CSCLK, during each one of the ten control signals of OP1. Therefore, during the ten control signals OP1, the ten most recent interval measurement numbers in the cascaded register are circulated, one during each control signal and the most recent one first from the left-hand end to the right-hand end of the cascaded register, with the result that at the end of OP1, the oldest measurement number is contained in the buffer register 56 and the register 58 contains the ten most recent measurments. Thus, when the buffer register is updated by a new interval measurement number the oldest measurement number is destroyed and replaced by the new measurement number.

As the ten most recent interval measurment numbers contained in store 18 are circulated end around during OP1 they are also fed, through the multiplexer 88, to the data bus 92 and by the data bus 92 to the adder 104. During OP1, the adder is conditioned to add the sequentially appearing four bit numbers on the data bus to one another and to store the result in the accumulator 106 so that at the end of OP1, the accumulator 106 contains the sum of the ten most recent interval measurement numbers of the store 18.

During OP2, the processor performs "slew" test to check the persistency of the incoming HAUDIO signal at a steady frequency throughout a period of time equivalent to ten measuring intervals. This is done by multiplying each of the ten most recent interval measurement numbers, now contained in the register 58, by ten and comparing each result with the sum of the last ten interval measurement numbers as now contained in the accumulator 106. This, it will be understood, is the equivalent of comparing each of the last ten measurement numbers with the average value of such last ten measurement numbers. To make the comparisons, during each of the ten control signals of OP2, the forty bit register 58 is circularly shifted four bit positions, by a burst of 4CSCLK. The four end around bits so generated during each control signal are transferred by the multiplexer 88 to the multiplier 102. The output of the multiplier is inverted so as to present the product of each multiplication in one's complement form. This complemented product is transmitted to the adder 104, through the multiplexer 90 and over the data bus 92, where it is added to the contents of the accumulator 106 for the purpose of comparing the product with the accumulator contents. If the absolute magnitude of the result of this addition is greater than a predetermined number, the SLEW flip-flop is set which, as explained in more detail hereinafter, indicates that the interval measurement numbers under process in the current processing cycle do not represent an acceptably steady tone and which prevents the processor from thereafter outputting, during the remainder of the processing cycle, a signal indicating the detection of a valid code tone. That is, if the SLEW flip-flop is set, the processing cycle the processor is in is completed, but the results of the further processing are ignored.

Various different numbers may be chosen as the predetermined number or standard used in the slew test, depending on the degree of frequency steadiness desired. Conveniently, the number used is the number sixteen. Thus, if the result of any one comparative addition is greater than 16, a 1 will appear in one or more of the four most significant bits of the result of the addition which condition in turn is readily detected by a simple logic circuit (not shown) for producing a signal to set the SLEW flip-flop 109. In summary then, during OP2, each of the ten most recent interval measurement numbers in the store 18 is multiplied by ten, the product is compared with the sum in the accumulator 106, and the SLEW flip-flop 109 set if the product and sum differ by an absolute value of greater than sixteen. Thus, to avoid setting of the SLEW flip-flop 109 during OP2, it is evident that each of the ten most recent numbers of the store 18 will have to be of substantially the same value, as will be the case only if the input HAUDIO signal has persisted at a substantially stable frequency during the time of the last ten measuring intervals (last fifty cycles of HAUDIO).

During OP3, the processor performs a "validity" test in which the sum contained in the accumulator 106 is compared, as the previously described test number, with the reference numbers in the HROM 94 to determine whether such sum or test number falls within one or four different ranges of values each associated with a respective one of the four high frequency code tones. The nature of this test is more clearly understood by reference to the following Table No. 2.

Table No. 2

| | HIGH FREQUENCY CODE TONES | |
|---|---|---|
| Measuring | Average No. of 6.364kc Pulses | Average |

Table No. 2-continued

| Tone No. | f | λ | Interval (5λ) | per interval = Davg. | Davg. - 16 | Accumulator Sum |
|---|---|---|---|---|---|---|
| 1 | 1209hz | .8271ms | 4.1356ms | 26.32 | 10.32 | 103.2 |
| 2 | 1336hz | .7485ms | 3.7425ms | 23.82 | 7.82 | 78.2 |
| 3 | 1477hz | .6770ms | 3.3852ms | 21.54 | 5.54 | 55.4 |
| 4 | 1633hz | .6124ms | 3.0618ms | 19.48 | 3.48 | 34.8 |

LOW FREQUENCY CODE TONES

| Tone No. | f | λ | Measuring Interval (3λ) | Average No. of 6.364ks Pulses per interval = Davg. | Davg. - 16 | Average Accumulator Sum |
|---|---|---|---|---|---|---|
| 1 | 697hz | 1.4347ms | 4.3042ms | 27.03 | 11.39 | 113.9 |
| 2 | 770hz | 1.2987ms | 3.8961ms | 24.79 | 8.79 | 87.9 |
| 3 | 852hz | 1.1737ms | 3.5211ms | 22.41 | 6.41 | 64.0 |
| 4 | 941hz | 1.0627ms | 3.1881ms | 20.29 | 4.29 | 42.9 |

This table shows all four high frequency code tones and all four low frequency code tones of Table No. 1. In addition to the frequency of each code tone, it also shows its period, the duration of its measuring interval and the number of 3.364kc COUNT pulses occurring during each measuring interval. The latter quantity is referred to as Davg and is the average number of COUNT pulses the associated counter 54 or 66 will count during a measuring interval if the associated code tone is present as the HAUDIO or LAUDIO signal. The quantity referred to in Table 2 as "Davg - 16" is the average value of the four bit number which is transferred from the counter 54 or 66 to the measurement store 18 or 22. The quantity referred to as "Average Accumulator Sum," is the average value of the sum contained in the accumulator 106 at the end of the OP1. The values of the latter two quantities of course are those which occur if the associated code tone has been present as HAUDIO or LAUDIO for the required amount of time. Of course, the counters, registers and accumulator do not handle the average values of Table 2 and instead at any one time contain whole numbers. For example, taking the 1336hz code tone of Table 2, if this tone is present as HAUDIO, the coutner 54 at the end of each measuring interval will contain a count of either 23 or 24 and the number transferred to the store 18 at the end of each measuring interval will be either a 7 or an 8. The sum of the ten most recent numbers stored in the store 18 and contained in the accumulator 106 at the end of OP1, assuming that HAUDIO has persisted at a steady 1336hz for the last ten interval measurements, will be either 78 or 79.

The numbers of the right-hand column of Table 2 are the important ones as far as the validity test is concerned, and it will be understood that in order for the actual accumulator sum, at the beginning of OP3, to represent a code tone it will have to match fairly closely one of the average accumulator sums of Table 2.

Table No. 3 shows the reference numbers stored in both the HROM 94 and the LROM 96 and the manner in which they define valid and invalid ranges of numbers.

Table No. 3

VALIDITY TEST REFERENCE NUMBERS

| CS During which used | HREF Nos. | LREF Nos. |
|---|---|---|
| | ↑ Invalid | ↑ Invalid |
| CS1 | 111 } Valid Tone No. 1 | 122 } Valid Tone No. 1 |

Table No. 3-continued

VALIDITY TEST REFERENCE NUMBERS

| CS During which used | HREF Nos. | LREF Nos. |
|---|---|---|
| CS2 | 97 } Invalid | 108 } Invalid |
| CS3 | 85 } Valid Tone No. 2 | 95 } Valid Tone No. 2 |
| CS4 | 73 } Invalid | 82 } Invalid |
| CS5 | 62 } Valid Tone No. 3 | 71 } Valid Tone No. 3 |
| CS6 | 51 } Invalid | 59 } Invalid |
| CS7 | 41 } Valid Tone No. 4 | 49 } Valid Tone No. 4 |
| CS8 | 30 Invalid ↓ | 38 Invalid ↓ |

Considering the HREF numbers of Table No. 3, the numbers are arranged in order of descending magnitude, and each is compared in sequence during OP3 with the number in the accumulator 106. In particular, if the accumulator number is greater than the first reference number (111) it is taken to be invalid, that is to not represent any code tone. If the accumulator number is less than or equal to 111 and greater than 97, it is taken to validly identify code tone No. 1 of the high frequency code tone group. If the accumulator number is less than or equal to 97 and greater than 85, it is taken to be invalid. Other valid and invalid ranges, and the tones identified by the other valid ranges are clearly evident from Table No. 3.

During the first control signal, CS1 of OP3, the first HREF reference number (111) is extracted from the HROM 94 and transmitted to the adder 104 which adds it serially to the eight bit number of the accumulator 106. The reference numbers, as previously mentioned, are stored in one's complement form so that if the accumulator number is greater than the reference number an end carry will be produced as a result of the addition.

During CS2, the second HREF reference number (97) is extracted and compared with the accumulator sum, and so on through the list of eight HREF numbers, as set out in Table No. 3, until the last HREF number (30) is compared with the accumulator sum during CS8. From this, it will be evident that the detection of a valid tone by the validity test of OP3 requires that an end carry be produced by the addition performed during CS2, CS4, CS6 or CS8 with no previous additions having resulted in an end carry. That is, if an end carry is first produced during CS2, this indicates the valid detection of code tone No. 1. If an end carry is first produced during CS4, this indicates the valid detection of code tone No. 2, if an end carry is first produced during CS6, this indicates the valid detection of code tone No. 3 and if an end carry is first produced during CS8, this indicates the valid detection of code tone No. 4.

Figure 4:
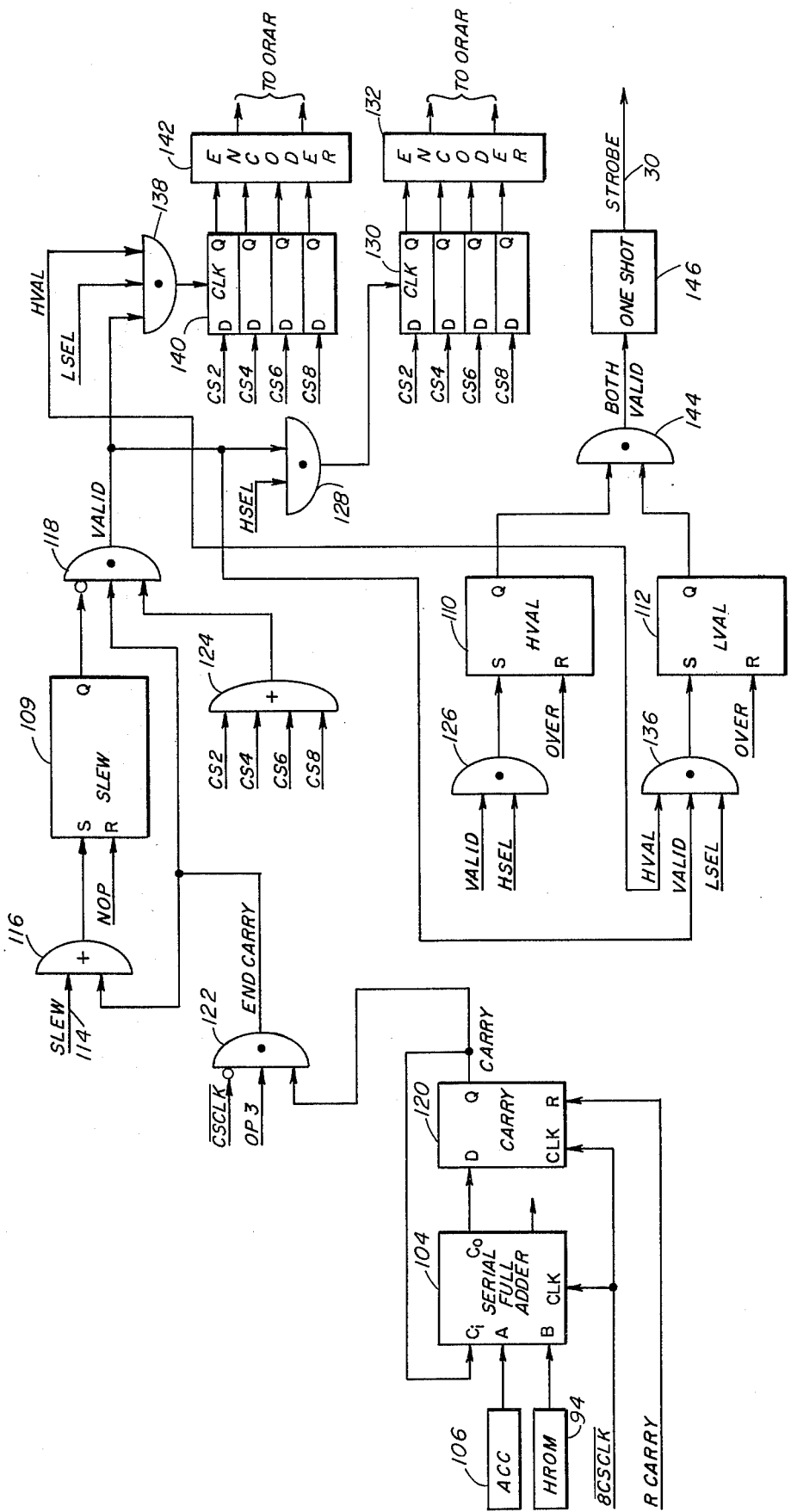
FIG. 4 is a block diagram showing in still more detail the construction of a portion of the processor of the tone decoder of FIGS. 1 and 2.

FIG. 4 shows in more detail the construction of the slew and validity test logic 108 of FIG. 2. Referring to this Figure, it assumes that at the moment illustrated the processor is assigned to the processing of data from the high frequency channel store 18 so that during OP3, reference numbers supplied to the adder 104 are HREF numbers taken from the HROM 94. Before considering the operation of the circuit of FIG. 4 during the validity test of OP3, it should be noted that during OP2, if any one of the ten comparisons made during the ten CS's of OP2 results in a number greater than sixteen (or other selected standard number) a slew setting signal is produced, as previously mentioned, and appears on the illustrated line 114 so as to pass through the OR gate 116 and set the SLEW flip-flop 109. This setting of the new SLEW flip-flop 109 in turn inhibits the output of a VALID signal from the AND gate 118, which VALID signal is necessary to the subsequent production, during OP3, of a signal indicated the detection of a valid code tone.

During each of the first eight control signals of OP3, a burst of 8CSCLK controls the adder 104 and its associated CARRY flip-flop 120 and the accumulator 106 and HROM 94 to cause the eight bit number of the accumulator 106 to be added to one of the eight bit HREF numbers extracted in sequence from the HROM. If the accumulator number is greater than the HREF number, the CARRY flip-flop 120 will be set at the end of the addition (that is, at the end of the burst of 8CSCLK), and this will produce an END CARRY signal from the AND gate 122, the CARRY flip-flop 120 being subsequently reset by R CARRY. If an END CARRY signal is produced, it will in turn produce a VALID signal from the AND gate 118 provided the SLEW flip-flop 109 is not set and provided the END CARRY signal occurs during either CS2, CS4, CS6 or CS8, as indicated by a signal from the OR gate 124. The END CARRY signal also sets the SLEW flip-flop 109 if not previously set. In this connection it should be noted that the SLEW flip-flop 109 is preferably one which is set on the negative going edge of the setting signal to avoid possible ambiguity in the output of the AND gate 118. Since END CARRY signals also set the SLEW flip-flop 109, the production of an END CARRY signal during one control signal inhibits the production of a VALID signal during any of the subsequent control signals of OP3.

If a VALID signal is produced from AND gate 118, it is gated by HSEL through AND gates 126 and 128. The output of AND gate 126 sets HVAL flip-flop 110, and the output of AND gate 128 is supplied to the common clock terminal of a group 130 of four flip-flops set respectively by CS2, CS4, CS6 and CS8. Accordingly when VALID appears, one of the four output lines of flip-flop group 130 will go high depending on which of the related four CS signals coincides with VALID, and this in turn identifies which of the four code tones of the high frequency code tone group has been detected. An encoder 132 is connected to the four output lines of flip-flop group 130 and encodes the signal input thereto into a two bit binary code transmitted to the output ROM address register 134 of the output memory 28, as shown in FIG. 2.

When the processor is assigned to processing data from the low frequency channel store 22 the opertion of the circuit of FIG. 4 is substantially the same as described above in connection with the processing of high frequency channel data except that LSEL signal will be present instead of the HSEL signal. Also, the results of the processing of the low channel data are accepted only if during a preceding processor cycle, the high frequency channel data have been processed and found to represent a valid code tone as indicated by the setting of HVAL flip-flop 110. Accordingly, when a VALID signal appears from the AND gate 118 during OP3 processing of low channel data, the presence of LSEL and HVAL, assuming previous setting of HVAL flip-flop 110, produces an output from AND gate 136 to set LVAL flip-flop 112. A similar output is produced from AND gate 138 which is applied to the common clock terminal of a group 140 of four flip-flops which produce an output on one of four output lines identifying the detected low code tone, this latter signal being encoded by an encoder 142 into a two bit binary number transmitted to the output ROM address register 134.

As mentioned, LVAL flip-flop 112 can only be set if HVAL flip-flop 110 has previously been set. Accordingly, when LVAL flip-flop 112 is set an output is produced from AND gate 144 indicating that valid code tones have been detected and identified from both the high frequency channel data and the low frequency channel data. This BOTH VALID signal is transmitted to a one shot multivibrator 146 which in response to the signal produces a STROBE pulse on the output line 30 indicating to a utilization device or circuit the existence of valid information in the output memory 28. Preferably the multivibrator 146 is one which produces an output pulse in response to the negative going edge of the input signal so that the STROBE pulse is not produced until the BOTH VALID signal is terminated by the resetting of the HVAL and LVAL flip-flop 110 and 112 as hereinafter described. In other words, the STROBE pulse is not produced until the key 12 of the touch dial pad 10 of FIG. 1 which was depressed to produce the detected code tones is released.

Returning to FIG. 2, the output memory 28 includes the output ROM address register 134. This is a four bit register, two bits of which identify the most recently detected valid high frequency code tone and the other two bits of which identify the most recently detected valid low frequency code tone, the register being updated each time the processor 24 detects and identifies, by the process described above, a new high or low frequency code tone. The register 134 addresses an output read only memory 136 which decodes the content or address of the address register 134 into a four bit binary number, appearing on the four output lines 32, 32, identifying the one of sixteen possible dial characters or information bits represented by the two code tones identified by the address register 134, in accordance with the combinational coding of Table No. 1. Thus, when the STROBE signal appears, the output lines 32, 32 of the output memory 28 contain, in the form of a four bit binary word, the information to be transmitted from the decoder at that time.

Referring to FIGS. 2 and 4, once HVAL 110 and LVAL 112 are set no further significant action is accomplished by the decoder so long as the detected high frequency code tone remains as HAUDIO and the detected low frequency code tone remains as LAUDIO. During this time the processor 24 continues repetitive and alternate processing of the high frequency channel data from the store 18 and the low frequency channel data from the store 22, but the results of this processing are merely superfluous settings of already set HVAL and LVAL flip-flops. Now, however, assume that the two code tones cease, as a result of the release of the key 12 of the touch tone pad 10 of FIG. 1 which generated them. If the high frequency code tone disappears in advance of the low frequency code tone, when this disappearance occurs, the HAUDIO signal takes on a low or zero frequency with the result that the eight bit binary counter 54 of the high frequency channel will overflow and produce an overflow signal referred to as OVER in FIGS. 2 and 4. Similarly, if the low frequency code tone disappears in advance of the high frequency code tone the eight bit binary counter 66 of the low frequency channel will overflow and produce an OVER signal. The OVER signal from either the counter 54 or the counter 66, as shown in FIG. 4, resets the HVAL and LVAL flip-flops 110 and 112 and thus conditions the processor for detecting and identifying a new pair of code tones when such code tones again appear on the AUDIO input line 14.

Figure 7A:
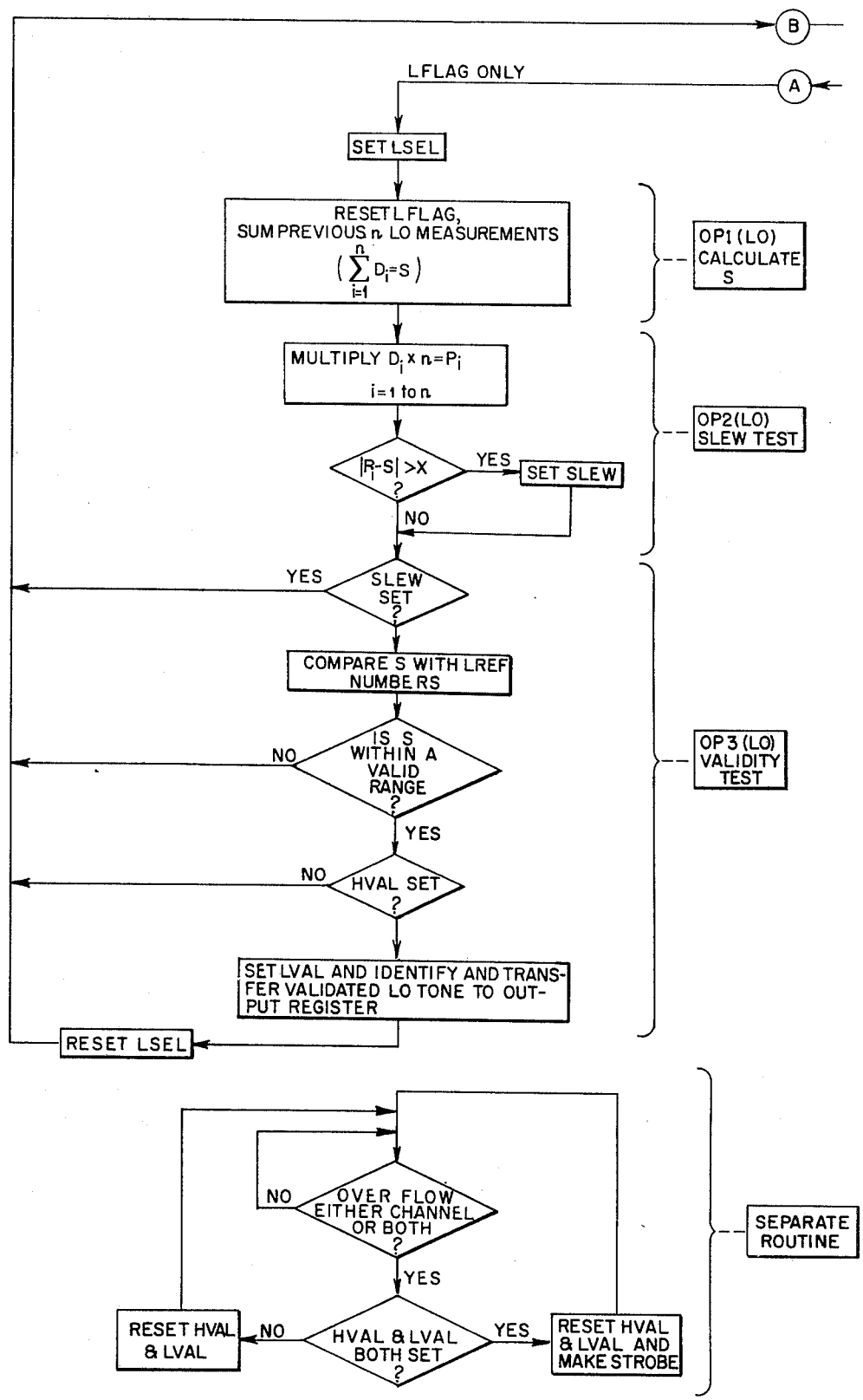
FIGS. 7a and 7b, when placed together as shown in FIG. 10, form a single figure, referred to hereinafter as FIG. 7, which is a flow diagram showing the data processing steps performed by the tone decoder of FIGS. 1 and 2.
Figure 7B:
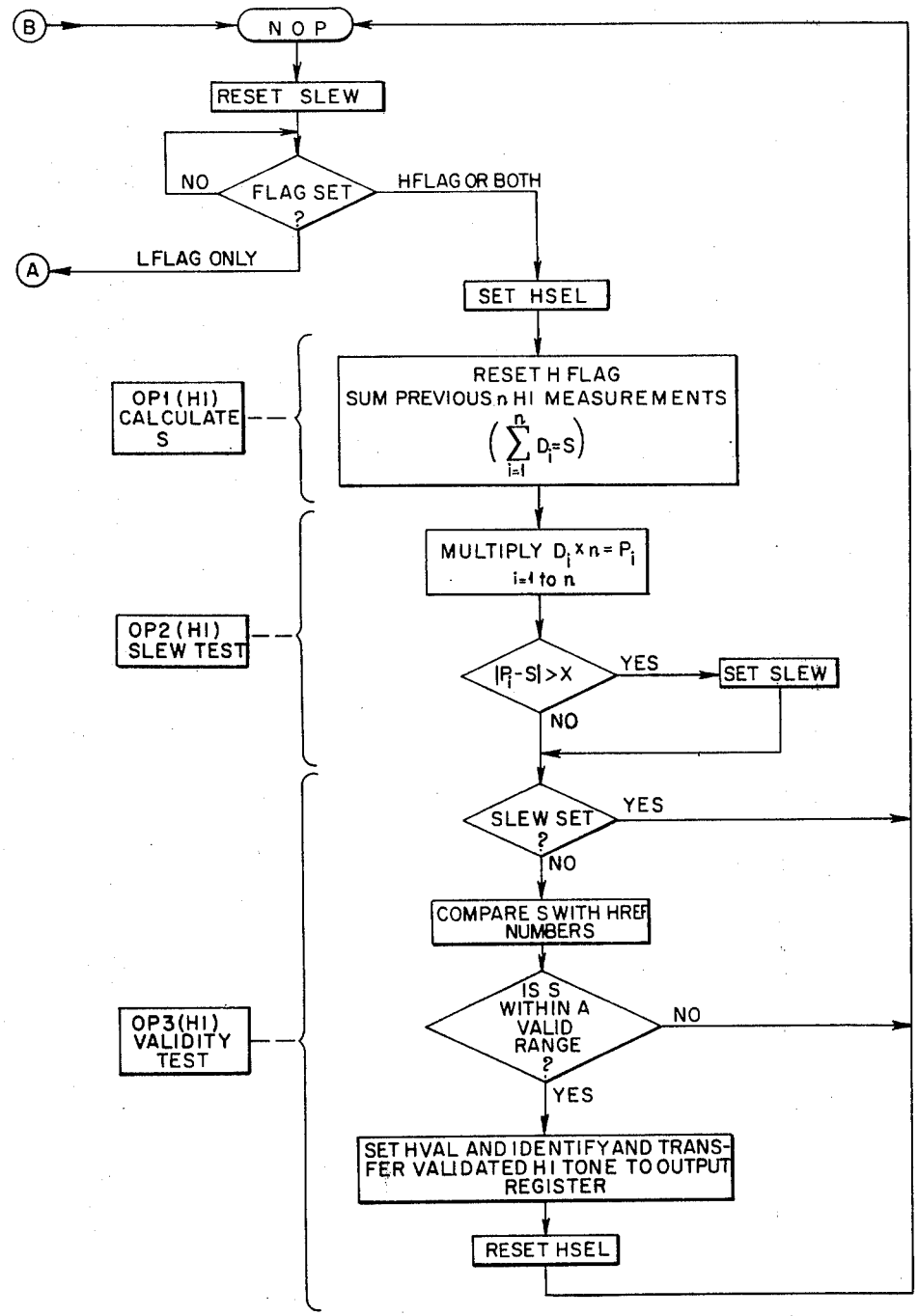

Having now described in detail the construction and operation of the tone decoder of this invention, such description may be recapitulated by reference to the flow diagram of FIG. 7. This flow diagram is sufficiently clear to not require any detailed commentary. However, it will be noted that when the processor returns to the NOP state, the SLEW flip-flop is reset and following that processing of either the high channel data or the low channel data is initiated in response to the set condition of one or the other or both of the HFLAG and LFLAG flip-flops. In FIG. 7, $D_i$ is the ith most recent interval measurement number in the associated store 18 or 22. S is the sum of the $n$ most recent interval measurement numbers, $P_i$ is the product resulting from the multiplication of $D_i$ times $n$ and X is the standard number against which the difference between $P_i$ and S is compared in the slew test. In the preceding described example, $n$ equals 10 and X equals 16, but these numbers are not critical to the invention and may vary in different embodiments thereof.

We claim:

1. A decoder for use in a communication system wherein bits of information to be communicated are represented on a communication line by a plurality of code tones of distinctive frequencies each corresponding to a respective one of said bits of information, said decoder comprising means responsive to an input signal appearing on a communication line for detecting repetitive intervals dependent on the period of said input signal and for producing a digital measurement of the length of each of said intervals, means responsive to said digital measurements for determining whether said input signal has persisted at an acceptably steady frequency within predescribed limits for a predetermined time and, if such persistence is found, for determining whether said frequency of said input signal is sufficiently close within predescribed limits to the distinctive frequency of one of said code tones as to be recognizable as such code tone and, if so, for producing a signal identifying the recognized code tone.

2. A decoder as defined in claim 1 further characterized by each of said intervals detected by said interval detecting and digital measurement producing means being equal to a given integral number of periods of said input signal.

3. A decoder as defined in claim 1 further characterized by said means for determining whether said signal has persisted at an acceptably steady frequency for a predetermined time comprising a means for producing and storing $n$ numbers having magnitudes related respectively to the last $n$ digital measurements of said intervals, and means operable during each of said intervals for analyzing said $n$ numbers to determine whether they are all of the same magnitude within predescribed limits and for producing a signal indicating acceptable steadiness if said $n$ numbers are all found to be of the same magnitude within said predescribed limits.

4. A decoder as defined in claim 3 further characterized by said means for analyzing said $n$ interval measurement numbers comprising a means for summing said $n$ numbers, a means for multiplying each of said $n$ numbers by $n$, and a means for comparing each of the $n$ products produced by said multiplying means with the sum produced by said summing means.

5. A decoder as defined in claim 4 further characterized by said means for comparing each of the $n$ products by said multiplying means including a means for producing a signal inhibiting the production of a signal identifying a recognized code tone if any one of said $n$ products is found by said comparing means to differ from said sum by more than a predetermined value.

6. A decoder as defined in claim 1 further characterized by said means for determining whether said frequency of said signal is sufficiently close to the frequency of one of said code tones as to be recognizable as such code tone comprising a means for storing a list of reference numbers defining a plurality of ranges of acceptable magnitudes, each of which ranges corresponds to a respective one of said code tones, separated by ranges of unacceptable magnitudes, means for producing a test number having a magnitude dependent on the magnitude of at least one of the last $n$ digital measurements of said intervals, and means for comparing said test number with said list of reference numbers to determine within which of said magnitude ranges said test number falls.

7. A decoder as defined in claim 6 further characterized by said means for producing a test number comprising a means for producing and summing $n$ numbers each related in magnitude to a respective one of said last $n$ digital measurements, the sum so produced being said test number.

8. A code tone decoder comprising a filter for separating the signal appearing on an input line into a low frequency channel signal and a high frequency channel signal, a low frequency channel means for detecting repetitive low channel intervals dependent on the period of said low frequency channel signal and for producing a digital measurement of the length of each of said low channel intervals, means responsive to said digital measurements of said low channel intervals for determining whether said low frequency channel signal has persisted at an acceptably steady frequency within predescribed limits for a predetermined time and, if such persistence is found, for determining whether said frequency of said low frequency channel signal is sufficiently close within predescribed limits to the frequency of one of a set of low channel code tones as to be recognizable as such low channel code tone and, if so, for producing a signal identifying the recognized low channel code tone, a high frequency channel means for detecting repetitive high channel intervals dependent on the period of said high frequency channel signal and for producing a digital measurement of the length of each of said high channel intervals, means responsive to said digital measurements of said high channel intervals for determining whether said high frequency channel signal has persisted at an acceptably steady frequency within predescribed limits for a predetermined time and, if such persistence is found, for determining whether said frequency of said low frequency channel signal is sufficiently close within predescribed limits to the frequency of one of a set of high channel code tones as to be recognizable as such high channel code tone and, if so, for producing a signal identifying the recognized high channel code tone.

9. A code tone decoder as defined in claim 8 further characterized by said means for determining whether said low frequency channel signal has persisted at an acceptably steady frequency for a predetermined time comprising a means for producing and storing $n$ low channel numbers having magnitudes related respectively to the last $n$ measurements of said low channel intervals and means operable during each of said low channel intervals for analyzing said $n$ low channel numbers and for producing a signal indicating acceptable steadiness if said $n$ low channel numbers are all found to be of the same magnitude within said predetermined limits, and said means for determining whether said high frequency channel signal has persisted at an acceptably steady frequency for a predetermined time comprising means for producing and storing $n$ high channel numbers having magnitudes related respectively to the last $n$ measurements of said high channel intervals, and means operable during each of said high channel intervals for analyzing said $n$ high channel numbers and for producing a signal indicating acceptable steadiness if said $n$ high channel numbers are all found to be of the same magnitude within said predetermined limits.

10. A code tone decoder as defined in claim 9 further characterized by said low channel and said high channel means for analyzing said $n$ low channel numbers and said $n$ high channel numbers comprising a means for summing the associated set of last $n$ numbers, a means for multiplying each of the associated set of $n$ numbers by $n$, and a means for comparing the sum produced by said summing means with each of the $n$ products produced by said multiplying means.

11. A code tone decoder as defined in claim 10 further characterized by said means for comparing each of the $n$ products produced by said multiplying means including a means for producing a signal inhibiting the production of a signal identifying a recognized code tone if any one of said $n$ products is found by said comparing means to differ from said sum by more than a predetermined value.

12. A code tone decoder as defined in claim 8 further characterized by said means for determining whether said frequency of said low frequency channel signal is sufficiently close to the frequency of one of a set of low channel code tones as to be recognizable as such low channel code tone comprising a means for storing a list of low channel reference numbers defining a plurality of ranges of acceptable magnitudes, each of which ranges corresponds to a respective one of said low channel code tones, separated by ranges of unacceptable magnitues, means for producing a low channel test number having a magnitude dependent on the magnitude of at least one of the last $n$ digital measurements of said low channel intervals, and means for comparing said low channel test number with said list of low channel reference numbers to determine within which of said magnitude ranges said low channel test number falls, and said means for determining whether said frequency of said high frequency channel signal is sufficiently close to the frequency of one of a set of high channel code tones as to be recognizable as such high channel code tone comprising a means for storing a list of high channel reference numbers defining a plurality of ranges of acceptable magnitudes, each of which ranges corresponds to a respective one of said high channel code tones, separated by ranges of unacceptable magnitudes, means for producing a high channel test number having a magnitude dependent on the magnitude of at least one of the last $n$ digital measuements of said high channel intervals, and means for comparing said high channel test number with said list of high channel reference numbers to determine within which of said magnitude ranges said high channel test number falls.

13. A code toner decoder as defined in claim 12 further characterized by said means for producing a test number, for each of said low and high channels, comprising a means for summing the associated set of $n$ numbers, the sum so produced being said test number.

14. A decoding means for use in a communication system wherein a plurality of characters to be communicated are each represented by an identifying pair of code tones appearing on a communication line with one code tone being one of a group of different high frequency code tones and with the other code tone of the pair being one of a group of different low frequency code tones, said decoding means comprising a filter means connectible with a tone transmiting communication line for separating from the signal on said communication line a low channel input signal and a high channel input signal, said low channel input signal including frequencies within a region embracing said low frequency code tone group and excluding said high frequency code tone group and said high channel input signal including frequencies within a region embracing said high frequency code tone group and excluding said low frequency code tone group, means responsive to each of said low and high channel input signals for repetitively producing a low channel digital signal having for each iteration a magnitude dependent on the current value of the frequency of said low channel input signal and for repetitively producing a high channel digital signal having for each iteration a magnitude dependent on the current value of the frequency of said high channel input signal, and means responsive to the magnitudes of said digital signals for producing an output signal identifying a communicated character if, and only if, the magnitude of each of said digital signals remains constant within a given tolerance throughout a given number of iterations and if, and only if, the magnitude of said low channel digital signal falls within a range of magnitudes identifying the low code tone of the code tone pair identifying said communicated character and the magnitude of said high channel digital signal falls within a range of magnitudes identifying the high code tone of the code tone pair identifying said commmunicated character.

15. A decoding means as defined in claim 14 further characterized by said means for repetitively producing a low channel digit signal and a high channel digit signal comprising, for each of said low and high channel input signals, means for detecting the cycles of the associated input signals and for producing an internal marking pulse at the end of each predetermined number of said cycles, a source of count pulses occurring at a frequency substantially greater than that of the associated input signal, and means for counting the number of said count pulses occurring during each successive interval as defined by successive ones of said internal marking pulses, the magnitudes of the counts made during successive intervals being the associated repetitively produced digital signal.

16. A decoding means as defined in claim 14 further characterized by a clock providing count pulses, said means for repetitively producing a low channel digital signal comprising a means for detecting the cycles of said low channel input signal and for producing low channel interval marking pulse at the end of each predetermined number of said cycles of said low channel input signal, and a low channel counter for counting count pulses from said clock during each successive low channel interval as defined by successive ones of said low channel interval marking pulses, the counts made during successive ones of said low channel intervals being said repetitively produced low channel digital signal, and said means for repetitively producing a high channel digital signal comprising a means for detecting the cycles of said high channel input signal and for producing a high channel interval marking pulse at the end of each predetermined number of said cycles of said high channel input signal, and a high channel counter for counting count pulses from said clock during each successive high channel interval as defined by successive ones of said high channel interval marking pulses, the counts made during successive ones of said high channel intervals being said repetitively produced high channel digital signal.

17. A decoding means as defined in claim 16 further characterized by the count pulses supplied to and counted by said low channel counter being of the same frequency as the count pulses supplied to and counted by said high channel counter, said predetermined number of cycles of said low channel input signal defining each of said low channel intervals being less than said predetermined number of cycles of said low channel input signal defining each of said high channel intervals.

18. A decoding means as defined in claim 15 further characterized by said means for detecting the cycles of said low channel input signal and for producing a low channel interval marking pulse at the end of each predetermined number of cycles of said low channel input signal including a low channel zero crossing detector for producing a low channel zero crossing pulse each time said low channel input signal crosses a given zero reference axis in one direction, and means for producing one of said low channel interval marking pulses in response to the occurrence of each $j$th one of said low channel zero crossing pulses where $j$ is said predetermined number of cycles of said low channel input signal, and said means for detecting the cycles of said high channel input signal and for producing a high channel interval marking pulse at the end of each predetermined number of cycles of said high channel input signal including a high channel zero crossing detector for producing a high channel zero crossing pulse each time said high channel input signal crosses a given zero reference axis in one direction, and means for producing one of said high channel interval marking pulses in response to the occurrence of each $k$th one of said high channel zero crossing pulses where $k$ is said predetermined number of cycles of said high channel input signal.

19. A decoding means as defined in claim 18 further characterized by said means responsive to the magnitudes of said digital signals for producing an output signal identifying a communicated character comprising a low tone address register, a high tone address register, a low tone validity register, a high tone validity register, means including a high channel store for producing and storing $n$ numbers related respectively to the magnitudes of the last $n$ iterations of said high channel digital signal, means including a low channel store for producing and storing $n$ numbers related respectively to the magnitudes of the last $n$ iterations of said low channel digital signal, means for processing during each of said low channel intervals the set of $n$ numbers then in said low channel store to:
  a. determine whether all of said $n$ numbers in said low channel store are of the same magnitude within predetermined limits,
  b. compare a test number derived from said set of $n$ numbers in said low channel store with a list of low channel reference numbers defining a plurality of separated magnitude ranges each corresponding to a respective one of said low frequency code tones, and
  c. if all of said $n$ numbers are found to be of the same magnitude within said predetermined limits and if said test number falls within one of said magnitude ranges, transfer to said low tone address register address register a number identifying the low frequency code tone corresponding to the magnitude range within which said test number falls and set said low tone validity register to a validity indicating state, and means for processing during each of said high channel intervals the set of $n$ numbers then in said high channel store to:
  a. determine whether all of said $n$ numbers in said high channel store are of the same magnitude within predetermined limits,
  b. compare a test number derived from said set of $n$ numbers in said high channel store with a list of high channel reference numbers defining a plurality of separated magnitude ranges each corresponding to a respective one of said high frequency code tones, and
  c. if all of said $n$ numbers are found to be of the same magnitude within said predetermined limits and if said test number falls within one of said mgnitude ranges, transfer to said high tone address register a number identifying the high frequency code tone corresponding to the magnitude range within which said test number falls and set said high tone validity register to a validity indicating state.

20. A decoding means as defined in claim 19 further characterized by said means for processing said set of $n$ numbers in said low channel store and said means for processing said set of $n$ numbers in said high channel store being a single processor having a fixed set of control sequences during the running of which one of said sets of $n$ numbers is processed, and means for assigning said processor to said two sets of $n$ numbers on a time shared basis.

21. A decoding means as defined in claim 19 further characterized by said test number derived from said set of $n$ numbers in said low channel store being the sum of said $n$ numbers in said low channel store, and said test number derived from said set of $n$ numbers in said high channel store being the sum of said $n$ numbers in said high channel store.

22. A decoding means as defined in claim 19 further characterized by said low channel counter being a binary counter having more than $i$ bit positions, said means for producing a low channel digital signal further comprising means responsive to the occurrence of each of said low channel interval marking pulses for transferring to said low channel store the number in the $i$-1 least significant bits of said low channel counter and for thereafter resetting said low channel counter to zero if the $i$th bit of said low channel counter is 1 and for transferring a zero number to said low channel store and for thereafter resetting said low channel counter to zero if said $i$th bit of said low channel counter is 0, said high channel counter being a binary counter having more than $i$ bit positions, and said means for producing a high channel digital signal further comprising means responsive to the occurrence of each of said high channel interval marking pulses for transferring to said high channel store the number in the $i$-1 least significant bits of said high channel counter and for thereafter resetting said high channel counter to zero if the $i$th bit of said high channel counter is 1 and for transferring a zero number to said high channel store and for thereafter resetting said high channel counter to zero if said $i$th bit of said high channel counter is 0.

23. A decoder as defined in claim 22 further characterized by each of said counters being operable to produce an overflow signal when the number of count pulses counted thereby during one counting interval exceeds the capacity of the counter, and means for producing strobe signal indicating that the contents of said high tone and low tone address registers are ready to be utilized if when an overflow signal from either one of said counters appears both said low tone validity register and said high tone validity register are set to indicate a valid low tone and a valid high tone respectively.

* * * * *

UNITED STATES PATENT OFFICE
CERTIFICATE OF CORRECTION

Patent No. 4,016,370          Dated April 5, 1977

Inventor(s) Chansak Laoteppitaks, Lincoln Henthorn and Charles B. Falconer

It is certified that error appears in the above-identified patent and that said Letters Patent are hereby corrected as shown below:

Col. 3, line 44, "No." should read --#--
Col. 5, line 65, "where" should read --wherein--
Col. 7, line 48, "dividy" should read --divide--
Col. 9, line 21, "O" should read --0--
Col. 9, line 30, "or" should read --of--
Col. 10, line 24, "circuit" should read --circuits--
Col. 10, line 38, "inverval" should read --interval--
Col. 10, line 44, "forth" should read --forty--
Col. 11, line 10, "KSEL" should read --LSEL--
Col. 11, line 45, after "80" cancel the word "to"
Col. 11, line 46, "and" should read --to--
Col. 11, line 62, "is" (first occurrence) should read --to--
Col. 11, line 66, "LSE1" should read --LSEL--
Col. 12, line 2, "the" (second occurrence) should read --its--
Col. 12, line 2, after "state" insert --to its CS1 state--
Col. 12, line 17, "in" should read --is--
Col. 12, line 20, cancel the word "a"
Col. 12, line 35, "sequenver" should read --sequencer--
Col. 12, line 51, "multiplexer" should read --multiplier--
Col. 12, line 55, "is" should read --to--
Col. 13, line 8, "extracted" should read --extracting--
Col. 13, line 21, "not" should read --now--
Col. 13, line 33, "or" should read --of--
Col. 13, line 39, before "OP1" insert the word --of--
Col. 14, line 60, "or" should read --of--
Col. 15, line 21, "3.364" should read --6.364--
Col. 15, line 37, after "contain" insert the word "only"
Col. 17, line 38, "cated" should read --cating--

UNITED STATES PATENT OFFICE
CERTIFICATE OF CORRECTION

Patent No. 4,016,370  Dated April 5, 1977

Inventor(s) Chansak Laoteppitaks et al.

It is certified that error appears in the above-identified patent and that said Letters Patent are hereby corrected as shown below:

Column 22, line 11, "magnitues" should read -- magnitudes --.

Signed and Sealed this twelfth Day of July 1977

[SEAL]

Attest:

RUTH C. MASON  
Attesting Officer

C. MARSHALL DANN  
Commissioner of Patents and Trademarks